ns having affinity for commercially available dyes. More specifically the invention relates to solutions of acrylonitrile polymers from which fibers capable of being dyed by conventional dyeing procedures may be produced.

Polymers of acrylonitrile, such as polyacrylonitrile and copolymers of 75 or more percent of acrylonitrile and up to 25 percent of other monomers copolymerizable therewith, such as vinyl acetate, methyl methacrylate and methacrylonitrile, are well known to be excellent fiber forming materials. However, due to poor dye susceptibility, these known copolymers are of limited utility and of little value in the preparation of general purpose fibers. In copending application Serial No. 106,490, filed July 23, 1949, by George E. Ham, of which application this is a continuation-in-part, there are described and claimed dye receptive copolymers and methods for their preparation from copolymers of 75 to 98 percent acrylonitrile and from two to 25 percent of a vinyl ester of a halogen substituted monocarboxylic acid. The method described in the said copending application involves the preparation of the copolymer and thereafter treating the polymer with an amine or with ammonia. The amine salt copolymers, although they have unusual dye receptivity, are often difficult to fabricate into fibers due to the instability of the solutions. Upon standing in the presence of amines and ammonia, acrylonitrile polymer solutions in dimethylacetamide or dimethylformamide may become gels, which cannot be extruded to form fibers by conventional procedures. Furthermore, some amines are not highly efficient in inducing dye receptivity and the larger proportions of these amines required may introduce deleterious effects in the ultimate fiber. Some amines, such as dimethylaniline are less effective, apparently since an ionization constant of at least $10^{-9}$ is desirable for significant quaternary salt formation.

The primary purpose of the present invention is to provide a new stable fiber spinning composition. A further purpose is to provide acrylonitrile copolymers capable of being dyed by conventional dyeing procedures, particularly with acid type dyestuffs. A still further purpose is to provide colored, high tenacity fibers from acrylonitrile.

It has been found that fiber forming copolymers of acrylonitrile and a vinyl ester of a halogen substituted monocarboxylic acid may be rendered dye receptive by reacting the polymer with certain tertiary amines while dissolved in a suitable acrylonitrile polymer solvent. This method is practicable with trimethylamine and triethylamine, which produces effects quite different from most primary amines, secondary amines and ammonia. The higher trialkyl amines are not generally useful, probably due to the difficulty of freeing them from primary and secondary amines. Furthermore, the higher weight proportions of the compounds required to achieve the optimum dyeing effect, often causes serious depreciation of the physical properties of the fibers. Since primary and secondary amines cause gelation, obviously it is desirable to use triethylamine and trimethylamine which has been carefully purified to minimize the concentration of the primary and secondary amines.

The copolymers which can be treated in accordance with this invention are the copolymers of 75 to 98 percent by weight of acrylonitrile and from two to 25 percent of a vinyl ester of α-chloroacetic acid. Copolymers of less than 75 percent acrylonitrile generally have less desirable fiber properties. On the other hand copolymers in excess of 98 percent acrylonitrile do not have, after reaction with the tertiary amines, sufficient active nitrogen atoms for inducing the desired degree of dye affinity.

This invention is practiced by reacting the copolymer with the trimethylamine or triethylamine while dissolved in a suitable fiber solvent. Any of the many well known acrylonitrile polymer solvents may be used in the practice of this invention, but preferred practice involves the use of N,N-dimethylacetamide, N,N-dimethylformamide or N,N-dimethylmethoxyamide. The reaction is conducted with sufficient tertiary amines to replace the available α-chlorine atoms. The completeness of the reaction will depend upon the reaction temperature polymer and amine concentrations in solutions, and thoroughness of mixing.

The intermediate copolymers of acrylonitrile and the vinyl esters of α-chloroacetic acid may be prepared by any polymerization procedure, but the preferred practice utilizes modified emulsion polymerization procedures wherein the copolymer is prepared in finely divided solid form for immediate use in the fiber fabrication operations. The preferred modified emulsion polymerization may utilize batch procedures wherein the monomers are charged with an aqueous medium containing the necessary catalysts and dispersing agents. A more desirable method involves the semi-continuous procedure, in which the polymerization reactor containing the aqueous medium is charged with the desired monomers gradually throughout the course of the reaction. Entirely continuous methods may also be used in which the monomers are gradually introduced to the reactor and the copolymers removed continuously.

The polymerization is catalyzed by means of any water soluble peroxy compound, for example sodium peroxide, hydrogen peroxide, sodium perborate, the sodium salts of other peroxy acids, and any other water soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as salts of triethanolamine and dodecylmethylamine, salts of rosin acids and mixtures thereof, the water soluble salts of half esters of sulfuric acid and long chain alkyl alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.01 to one percent by weight of the monomers may be employed.

The preferred methods of operation are those which produce a copolymer of very uniform chemical and physical properties. Other characteristics of the copolymer are frequently of great importance, for example the particle size of the dispersion which is primarily concerned with the ease of filtration, the water to monomer ratio which must necessarily be low for the most economical production, and the yield and conversion of the monomers to copolymer.

The emulsion polymerizations are preferably conducted in glass or glass-lined vessels which are provided with a means for agitating the contents. Generally rotary stirring devices are the most effective means of insuring the intimate contact of the reagents, but other methods may be successfully employed, for example by rocking or tumbling the reactors. The polymerization equipment generally used is conventional in the art and the adaptation of a particular type of apparatus to the reaction contemplated is within the province of one skilled in the art.

The optimum technique in polymerization for producing fiber forming resins involves the use of polymerization regulators to prevent the formation of polymer units of excessive molecular weight. Suitable regulators are the alkyl and aryl mercaptans, carbon tetrachloride, chloroform, dithioglycidol and alcohols. The regulators may be used in amounts varying from 0.001 to two percent on the weight of the monomer to be polymerized.

When the polymerization is complete the polymer is separated from the aqueous medium by any of the conventionally used methods. If the dispersion is very stable it may be necessary to break the emulsion, for example by adding acids, bases, salts or alcohol. When the optimum procedures above described are used the polymer may be separated from the aqueous phase by filtration. The resulting polymer in either case may require washing operations to remove traces of soluble catalyst or dispersing agent.

The solid granular copolymer of acrylonitrile and vinyl esters of $\alpha$-chloroacetic acid is useful in the preparation of fibers by conventional methods. The preferred practice involves the preparation of spinning solutions by dispersing the polymer in suitable solvents, for example N,N-dimethylformamide, N,N-dimethylacetamide, gamma-butyrolactone or $\alpha$-cyanoacetamide. The polymer solutions are fabricated into fibers by extrusion through a suitable die, or a spinneret containing a plurality of minute apertures, into a medium which removes the solvent and causes the polymer to precipitate in a continuous linear form. The said medium may be a liquid, for example water, or aqueous solutions of acids, bases, or salts, or it may be a gas, for example air or any gas which is inert with respect to the polymer.

In the practice of the present invention the conventional fiber spinning procedure is utilized, except that it is modified by the incorporation of a stoichiometric proportion of a trialkylamine, wherein each alkyl group has up to two carbon atoms. The trialkylamine may be dissolved in the solvent prior to the addition of the resin or the resin solution may be prepared separately and the trialkylamine added thereto. Generally it is desirable to stir or otherwise agitate the solution to insure uniform distribution and reaction of the trialkylamine with the polymer. Heating, for example to 40 to 70° C. may be desirable to accelerate the reaction and increase the yields. Although it is not probable that one hundred percent of the polymer is reacted with the amine, substantially complete reactions may be achieved.

Further details of this invention are set forth with respect to the following examples.

*Example 1*

A 3-necked, round-bottomed flask, provided with a dropping funnel, a thermometer and a rotary stirring mechanism was charged with 11,100 grams of distilled water and three grams of the sodium salt of mahogany acid, and heated to 80–82° C. A mixture of 2550 grams of acrylonitrile and 450 grams of vinyl $\alpha$-chloroacetate was added gradually to the reaction mass through the dropping funnel at such a rate that 120 minutes was required for complete charging. A solution of 22.5 grams of potassium persulfate and 900 grams of water was prepared and added in six equal increments to the reaction mass, one increment initially and the other at twenty minute intervals. After all of the monomers had been added to the mixture it was maintained at reflux conditions for an additional thirty minutes.

The unreacted monomers were removed by steam distillation. A total of 2737 grams of a copolymer of 92.2 percent acrylonitrile and 7.8 percent vinyl α-chloroacetate was obtained, which possessed a specific viscosity of 0.17 in 0.1 percent dimethylformamide.

Forty-five cubic centimeters of a commercial aqueous solution of 25 percent trimethylamine was mixed with five cc. of ten percent sodium hydroxide and two ccs. of benzene sulfonyl chloride. The trimethylamine was then distilled from the solution up to a temperature of 60° C. and collected in a receiver containing 93.5 grams of N,N-dimethylacetamide. When the distillation was stopped at 60° C., 10.1 grams of trimethylamine had been recovered. A spinning solution was produced by dissolving 25 grams of the copolymer prepared above in 88.7 grams of dimethylacetamide by stirring at 75° C. Then the solution was cooled to 50° C. and 13.9 ccs. of the standard trimethylamine-dimethylacetamide solution produced above was added and stirring was continued for five minutes at 50° C. This solution was spun into a mixture of 67 percent N,N-dimethylacetamide and 33 percent water. The fiber so produced was washed with water and stretched 450 percent. The fiber had a tenacity of 3.3 grams per denier, and an elongation of 7.9 percent. A one gram skein of fiber was heated with a mixture of one cc. of a two percent Wool Fast Scarlet G Supra solution, five ccs. of three percent sulfuric acid, and 40 ccs. of water for one hour at 100° C. Complete exhaustion of the dyebath occurred and a bright scarlet color was developed on the skein.

Complete dye bath exhaustion was also obtained with Alizarin Light Blue 4 GL and Acid Green CC Extra Conc. Standard launderometer tests with these dyed skeins indicated no fading onto multi-fiber cloths containing silk, viscose rayon, wool, cotton, and acetate rayon. The dyed skeins also possessed good dry-cleaning fastness.

The copolymer of acrylonitrile and vinyl α-chloroacetate prior to treatment with the amine was spun but the fiber so obtained was not dyeable with the same dyestuffs.

Example 2

Using the equipment similar to that described in Example 1, a mixture of 184 grams of acrylonitrile, 16 grams of vinyl α-chloroacetate and 0.4 grams of t-dodecylmercaptan was added continuously over a period of 70 minutes to a mixture of 280 grams of water and 0.2 gram of Acto 450 maintained at 80° C. A solution of two grams of potassium persulfate in 120 grams of water was added in six increments during the reaction. After addition of monomer was complete, the reaction mixture was allowed to reflux for one-half hour and then steam distilled to remove unreacted monomer. The reaction mixture was filtered, washed with water, and dried. A total of 183.8 grams of a copolymer containing 96.7 percent acrylonitrile and 3.3 percent vinyl α-chloroacetate was obtained. (Specific viscosity in 0.1 percent dimethylformamide=0.22.) A total of twenty grams of this copolymer was dissolved in 105 grams of dimethylacetamide at 80° C. and cooled to 50° C. A solution of 0.63 gram of trimethylamine and 7.4 grams of dimethylacetamide was added to the polymer solution, and the mixture obtained was heated at 50° C. for five minutes. The solution was then spun, yielding a fiber which gave 51 percent dyebath exhaustion with Wool Fast Scarlet as described above and was dyed a bright scarlet.

Example 3

A copolymer of 93.9 percent acrylonitrile and 6.1 percent vinyl α-chloroacetate was produced, using the method described in Example 1, from a charge of 90 percent acrylonitrile and ten percent vinyl α-chloroacetate, one percent potassium persulfate, 0.1 percent sodium salt of a mahogany acid, and 2:1 water-monomer ratio. When a solution of the copolymer in dimethylacetamide was treated with trimethylamine and spun as in Example 1, a fiber was obtained which exhausted the Wool Fast Scarlet dyebath within eight minutes at 100° C.

Example 4

A copolymer of 87 percent acrylonitrile and 13 percent vinyl α-chloroacetate produced from a mixture of 80 percent acrylonitrile and 20 percent vinyl α-chloroacetate as in Example 1, was dissolved in sufficient dimethylacetamide to produce a 17 percent solution. Stoichiometric quantities of various amines were added and the solutions were heated at 75° C. Gelation times of various amines were ammonia (one hour), diethylamine (one hour), cyclohexylamine (one hour), dimethylcyclohexylamine (one hour), diethanolamine (one hour), ethanolamine (4 hours), trimethylamine (>3 days), N,N-dimethylallylamine (6 hours), triethanolamine (2 hours), aniline (30 hours), N-methylaniline (40 hours), and dimethylaniline (>48 hours).

The invention is defined by the following claims:

1. A fiber spinning solution of a copolymer of 75 to 98 percent of acrylonitrile and from two to 25 percent of a vinyl ester of α-chloroacetic acid, said copolymer having been contacted and reacted with a trialkylamine wherein the alkyl group has up to two carbon atoms, and a solvent for the acrylonitrile copolymers.

2. A method of preparing a fiber spinning solution, which comprises mixing a copolymer of 75 to 98 percent acrylonitrile and from two to 25 percent of a vinyl ester of α-chloroacetic acid, approximately a stoichiometric equivalent of a trialkylamine wherein the alkyl group has up to two carbon atoms, and a solvent for the acrylonitrile copolymers, whereby a quaternization reaction between the copolymer and the amine take place.

3. A fiber spinning solution of a copolymer of 75 to 98 percent of acrylonitrile and from two to 25 percent of a vinyl ester of α-chloroacetic acid, said copolymer having been contacted and reacted with trialkylamine wherein the alkyl group has up to two carbon atoms, and N,N-dimethylacetamide.

4. A method of preparing a fiber spinning solution, which comprises mixing a copolymer of 75 to 98 percent acrylonitrile and from two to 25 percent of a vinyl ester of α-chloroacetic acid, approximately a stoichiometric equivalent of a trialkylamine wherein the alkyl group has up to two carbon atoms, and N,N-dimethylacetamide, whereby a quaternization reaction between the copolymer and the amine take place.

5. A fiber spinning solution of a copolymer of 75 to 98 percent of acrylonitrile and from two to 25 percent of a vinyl ester of α-chloroacetic acid, said copolymer having been contacted and reacted with trialkylamine wherein the alkyl group has up to two carbon atoms, and N,N-dimethylformamide.

6. A method of preparing a fiber spinning solution, which comprises mixing a copolymer of 75 to 98 percent acrylonitrile and from two to 25 percent of a vinyl ester of α-chloroacetic acid, approximately a stoichiometric equivalent of a trialkylamine wherein the alkyl group has up to two carbon atoms, and N,N-dimethylformamide, whereby a quaternization reaction between the copolymer and the amine takes place.

7. A fiber spinning solution comprising a copolymer of 75 to 98 percent acrylonitrile and from two to 25 percent of a vinyl chloroacetate, said copolymer having been contacted and reacted with a stoichiometric equivalent of triethylamine, and a solvent for the acrylonitrile copolymers.

8. A method of preparing a fiber spinning solution, which comprises mixing a copolymer of 75 to 98 percent acrylonitrile and two to 25 percent of vinyl chloroacetate, a stoichiometric equivalent of triethylamine and a solvent for the acrylonitrile copolymers, whereby a quaternization reaction between the copolymer and the amine takes place.

9. A fiber spinning solution comprising a copolymer of 75 to 98 percent acrylonitrile and from two to 25 percent of a vinyl chloracetate, said copolymer having been contacted and reacted with a stoichiometric equivalent of trimethylamine, and a solvent for the acrylonitrile copolymers.

10. A method of preparing a fiber spinning solution, which comprises mixing a copolymer of 75 to 98 percent acrylonitrile and two to 25 percent of vinyl chloroacetate, a stoichiometric equivalent of trimethylamine and a solvent for the acrylonitrile copolymers, whereby a quaternization reaction between the copolymer and the amine takes place.

11. A fiber spinning solution comprising a copolymer of 75 to 98 percent acrylonitrile and from two to 25 percent of a vinyl chloroacetate, said copolymer having been contacted and reacted with a stoichiometric equivalent of trimethylamine, and N,N-dimethylformamide.

12. A method of preparing a fiber spinning solution, which comprises mixing a copolymer of 75 to 98 percent acrylonitrile and two to 25 percent of vinyl chloroacetate, a stoichiometric equivalent of trimethylamine, and N,N-dimethylformamide, whereby a quaternization reaction between the copolymer and the amine take place.

13. A fiber spinning solution comprising a copolymer of 75 to 98 per cent of acrylonitrile and two to 25 per cent of vinyl chloroacetate, said copolymer having been contacted and reacted with a stoichiometric equivalent of trimethylamine, and N,N-dimethylacetamide.

14. A method of preparing a fiber spinning solution which comprises mixing a copolymer of 75 to 98 per cent acrylonitrile and from two to 25 per cent of vinyl chloroacetate, a stoichiometric equivalent of trimethylamine and N,N-dimethylacetamide, whereby a quaternization reaction between the copolymer and the amine takes place.

GEORGE E. HAM.

REFERENCES CITED

The following references are of record in the file of this patent:

UNITED STATES PATENTS

| Number | Name | Date |
|---|---|---|
| 2,332,899 | D'Alelio | Oct. 26, 1943 |
| 2,418,942 | Morgan | Apr. 15, 1947 |